United States Patent
Schulze

(10) Patent No.: US 11,388,906 B2
(45) Date of Patent: Jul. 19, 2022

(54) ARRANGEMENT AND METHOD FOR SKINNING POULTRY PARTS CONTAINING THE POULTRY BREAST

(71) Applicant: Nordischer Maschinenbau Rud. Baader GmbH + Co. KG, Lübeck (DE)

(72) Inventor: Adrian Schulze, Lubeck (DE)

(73) Assignee: Nordischer Maschinenbau Rud. Baader GmbH + Co. KG, Lübeck (DE)

(*) Notice: Subject to any disclaimer, the term of this patent is extended or adjusted under 35 U.S.C. 154(b) by 0 days.

(21) Appl. No.: 16/982,840

(22) PCT Filed: Mar. 29, 2018

(86) PCT No.: PCT/EP2018/058206
§ 371 (c)(1),
(2) Date: Sep. 21, 2020

(87) PCT Pub. No.: WO2019/185155
PCT Pub. Date: Oct. 3, 2019

(65) Prior Publication Data
US 2021/0051968 A1 Feb. 25, 2021

(51) Int. Cl.
*A22C 21/00* (2006.01)
*A22B 5/16* (2006.01)

(52) U.S. Cl.
CPC .......... *A22C 21/0092* (2013.01); *A22B 5/166* (2013.01); *A22C 21/0053* (2013.01)

(58) Field of Classification Search
CPC .. A22C 21/0092; A22C 21/0053; A22B 5/166

USPC ........................................................ 452/130
See application file for complete search history.

(56) References Cited

U.S. PATENT DOCUMENTS

| 4,723,339 A * | 2/1988 | van de Nieuwelaar ..................... A22C 21/0092 452/130 |
|---|---|---|
| 5,468,180 A | 11/1995 | Jordan et al. |
| 8,500,522 B2 | 8/2013 | Drabbels et al. |
| 9,675,086 B2 | 6/2017 | Janssen et al. |

(Continued)

FOREIGN PATENT DOCUMENTS

| CN | 102711488 A | 10/2012 |
|---|---|---|
| CN | 105636448 A | 6/2016 |

(Continued)

OTHER PUBLICATIONS

International Search Report dated Nov. 27, 2018; International Application No. PCT/EP2018/058206.

*Primary Examiner* — Richard T Price, Jr.
(74) *Attorney, Agent, or Firm* — Dinsmore & Shohl LLP

(57) ABSTRACT

An arrangement for skinning poultry parts containing the poultry breast includes a conveying device having saddle elements configured for conveying the poultry parts in a conveying direction along a skinning device. The skinning device has at least one rotationally driven profiled roller and a guide element. The roller, together with an entry edge of the guide element, is adapted to form an entry gap for gripping the skin on the side of the poultry breast. The guide element has flank guide elements each adapted for laterally guiding the poultry part, wherein the flank guide elements have inner guide surfaces adapted for contacting the flesh of the poultry part. A method is also provided.

33 Claims, 6 Drawing Sheets

(56) References Cited

U.S. PATENT DOCUMENTS

| | | | |
|---|---|---|---|
| 2009/0170417 A1* | 7/2009 | Janssen | A22C 21/0023 |
| | | | 452/136 |
| 2011/0092146 A1* | 4/2011 | Gasbarro | A22C 21/0092 |
| | | | 452/125 |
| 2013/0270413 A1* | 10/2013 | Wilber | A47B 23/043 |
| | | | 248/558 |
| 2019/0142021 A1* | 5/2019 | Van Hillo | A22C 21/0053 |
| | | | 452/128 |
| 2021/0120829 A1* | 4/2021 | Van der Waal | A22C 21/0007 |

FOREIGN PATENT DOCUMENTS

| | | |
|---|---|---|
| EP | 1574133 A1 | 9/2005 |
| EP | 3041361 A1 | 7/2016 |
| EP | 3068229 A1 | 9/2016 |
| NL | 8302207 A | 1/1985 |

\* cited by examiner

ARRANGEMENT AND METHOD FOR SKINNING POULTRY PARTS CONTAINING THE POULTRY BREAST

CROSS-REFERENCE TO RELATED APPLICATIONS

This application is the U.S. national stage of PCT/EP2018/058206 filed Mar. 29, 2018, all of which is hereby incorporated by reference in its entirety.

FIELD OF THE INVENTION

The present invention relates to an arrangement for skinning poultry parts containing the poultry breast, having a conveying device which comprises saddle elements configured for conveying the poultry parts in a conveying direction along a skinning device, and the skinning device comprises at least one rotationally driven profiled roller and a guide element, wherein the roller, together with an entry edge of the guide element, is adapted to form an entry gap for gripping the skin on the poultry breast side.

The invention relates further to a method for skinning poultry parts containing the poultry breast, comprising the steps: conveying the poultry parts in a conveying direction along a skinning device by means of saddle elements of a conveying device, driving at least one profiled roller in rotation, wherein the roller, together with an entry edge of a guide element, forms an entry gap for gripping the skin on the poultry breast side, automatically gripping the skin by means of the entry gap.

BACKGROUND OF THE INVENTION

Such arrangements and methods are used in mechanical poultry processing. Before poultry carcasses are filleted, they must be skinned. Accordingly, the skinning of poultry breast caps and front halves in filleting machines is carried out using skinners, which remove the skin from the fillets by means of a roller and a stationary clamping shoe.

Such skinners are known, for example, from document US 2011/092146 A1.

A disadvantage of the known skinners and skinning methods is that the skin is not removed reliably and completely. The skinning of poultry breast caps and poultry front halves in particular is difficult owing to special anatomical conditions. Thus, the skin in the region of the respiratory fold is adhered to the poultry carcass. This means that the skin does not detach completely and/or cannot be separated from the poultry body in a controlled manner.

The problem of skin parts remaining on the fillets can be solved, for example, by carrying out processing steps suitable for that purpose. The skin adhering to the fillet is simply separated in this way. However, on the one hand an additional processing step is necessary, and on the other hand there is a loss of yield, since the fillet size is reduced by the trimming cut.

SUMMARY OF THE INVENTION

Accordingly, it is an object of the present invention to propose an arrangement which ensures that the poultry skin is automatically removed completely and with a high degree of reliability. A further object is to propose a corresponding method.

The object is achieved by an arrangement having the features mentioned hereinbefore in that the guide element comprises flank guide elements each adapted for laterally guiding the poultry part, wherein the flank guide elements have inner guide surfaces adapted for abutting the flesh of the poultry part. By means of the guide element according to the invention, the poultry carcass is guided in a defined manner during the skinning process and at the same time the skin is removed from the poultry fillets in a controlled manner.

The inner guide surfaces which come into contact with the flesh assist with the process of removing the skin from the poultry carcass until the skin is still connected with the poultry carcass only in the region of the respiratory fold. As a result of the precise guiding, final controlled separation of the skin from the poultry body only takes place once all the regions of the skin have been detached from the poultry body.

The guide element according to the invention having the flank guide elements is adapted additionally to lift the poultry bodies as they pass through the guide element, in such a manner that the distance from the roller increases. In this manner, in addition to the pulling force already generated by the rotationally driven roller, an additional force that assists with detaching the skin is exerted. Shortly before the poultry carcass or the poultry part has passed completely through the guide element according to the invention, it reaches the highest position with the greatest distance from the roller. In this position, the poultry skin is maximally tightened by the mentioned acting forces and, in the course thereof, is finally and substantially completely detached from the poultry carcass.

The guide element is preferably configured as a shaped body, for example as a hollow or solid body. In particular, the guide element is configured in one piece. The guide element is, for example, milled from solid material or manufactured by 3D printing.

An expedient embodiment of the invention is characterised in that the flank guide elements each comprise outer guide surfaces which are adapted for guiding the skin connected on the poultry part side, wherein the outer guide surfaces in each case extend between the entry edge and a separating edge, at which in each case the inner guide surface adjoins the outer guide surface.

The outer guide surfaces thus additionally form directing surfaces for the defined guiding of the detached skin regions. In this manner, the guide element passes during the skinning process between the skin to be removed and the flesh. The inner guide surfaces thereby serve substantially to guide the poultry carcass, while the outer guide surfaces are configured and adapted for guiding and directing the poultry skin. The outer guide surfaces are in particular adapted to direct the skin into the entry gap of the skinning device and at the same time to effect tightening of the skin, so that the skin is detached from the poultry body while constantly being subjected to a pulling force and finally is also detached precisely at the connection, which is present to the end, with the poultry body in the region of the respiratory fold.

An advantageous further development is distinguished in that the inner guide surfaces with their separating edge are each curved at least substantially concavely. Owing to the concavity of the inner guide surfaces, they cling optimally to the fillets of the poultry carcass and thus ensure precise guiding and support of the poultry part during skinning. Further preferably, the geometry of the inner guide surfaces is adapted to the average geometry of the poultry parts to be processed. The inner guide surfaces can be curved completely concavely or substantially concavely. Inner surface geometries that are curved concavely multiple times in different spatial directions can also be used.

According to a further preferred embodiment, the guide element comprises a contact surface arranged between the inner guide surfaces, wherein the contact surface, starting from the entry edge, forms a run-on ramp which is inclined by an angle α relative to a roller tangential. The contact surface offers the advantage that the poultry part is elastically squeezed and compressed to a certain extent. On the one hand, this facilitates the process of detaching the skin and, on the other hand, leads to the poultry part being changed, namely lifted, in respect of its vertical position relative to the conveying device. This causes the skin to be guided away from the roller, as a result of which the skin is further stretched elastically and the detachment forces increase accordingly. The detachment forces thus reach orders of magnitude which are sufficient to finally detach the skin that is adhered in the region of the respiratory fold.

A further expedient embodiment of the invention is characterised in that the separating edge in each case laterally adjoins the contact surfaces seamlessly. There is thus formed a continuous directing surface which is free of steps and protrusions and is as smooth as possible and which on the one hand allows the poultry part to be guided with as little resistance as possible and at the same time avoids damage due to mechanical action on the poultry fillets.

According to a further preferred embodiment of the invention, the contact surface edge of the contact surface is adapted to adjoin the entry edge directly. Advantageously, the "threading" of the skin into the entry gap is thus assisted by a defined entry edge and, immediately after the skin has been gripped, the previously described compression with simultaneous lifting of the poultry part is effected. It is thereby ensured that the guide element according to the invention slides between the skin to be removed and the remainder of the poultry carcass and that the skin which, owing to the conveying direction, follows is directed into the entry gap.

A further expedient embodiment of the invention is characterised in that the flank guide elements are so configured that the clear width between the inner guide surfaces tapers in the conveying direction. This effects an additional lateral compression which acts on the flanks of the poultry part or of the poultry carcass. At the same time, the inner guide surface, closed under light pressure, in the flank region of the poultry carcass is in contact with the flesh and thus assists with the skin-detaching action.

A preferred further development of the invention is distinguished in that the inner guide surfaces of the flank guide elements each have an end edge, wherein in each case the end edge of one of the inner guide surfaces is shorter than the respective portion of the separating edge of the same inner guide surface. The separating edge, which is adapted to pass between the skin and the poultry body comprising the flesh, defines an entry cross-section of the guide element according to the invention. The entry cross-section refers to the free cross-sectional area which, from the point of view of the poultry body, first forms a free passage on entry into the guide element. The end edges define the exit cross-section of the guide element according to the invention, that is to say the cross-sectional area that is available when the poultry body leaves the effective range of the guide element. The chosen relationship of the respective lengths of the end edges and separating edge has the result that the free cross-section reduces constantly along the line of passage of the poultry, in order to achieve the effects described above.

According to a further preferred embodiment of the invention, each of the inner guide surfaces is configured as an enveloping surface which spans the region between the end edge and the separating edge of the respective inner guide surface. The enveloping surface forms a support surface which is as smooth as possible and which allows the flesh surfaces of the poultry part to slide over with as little resistance as possible.

A further expedient embodiment of the invention is characterised in that the separating edge, the contact surface edges and/or the end edges are in rounded form. The rounded form reduces the risk of otherwise possible damage to the flesh tissue. In addition, the rounding of the separating edge in particular has a positive effect on the threading behaviour of the skin into the entry gap. If the skin comes into contact with the separating edge first, it is squeezed briefly at the blunt separating edge, so that it is gripped by the roller and reliably pulled into the entry gap. The flesh is reliably directed via the rounded separating edge to the inner guide surfaces or to the contact surface. The rounding of the contact surface edges and/or of the end edges provides good sliding behaviour of the skin guided thereover. Undesirable tearing of or damage to the skin is thus reliably avoided, which could otherwise lead to the skin being torn off uncontrollably and could adversely affect the detachment result.

According to a further preferred embodiment, the roller is driven by means of a drive unit, in such a manner that the circumferential speed of the roller is greater than the conveying speed of the conveying device. In other words, the entry speed with which the skin is pulled into the entry gap is greater than the speed with which the poultry parts are conveyed in the conveying direction. The skin is in advance of the poultry carcass. As a result, the skin is elastically tightened, which further assists with the detachment process.

A further expedient embodiment of the invention is characterised in that, in the region of the flank guide elements, the roller has a peripheral surface profile which is inclined relative to its axis of rotation. The peripheral surface profile is thus adapted to slope in the mentioned region relative to the circumferential direction of the roller. The skin is therefore acted on not only by a pulling force in the circumferential direction of the roller, but also by an additional force component perpendicular to the circumferential direction or parallel to the axis of rotation of the roller. By means of this transverse force component, it is possible to spread the skin as extensively as possible over the roller circumference and to distribute it thereon as extensively as possible, in order to assist with the detaching action as a whole.

According to a further preferred embodiment of the invention, the peripheral surface profiles in the region of the flank guide elements are each inclined to the end faces of the roller contrary to the direction of rotation of the roller. Advantageously, the skin is thus directed outwards, namely to the roller sides or the end faces of the roller. As a result, blocking of the entry gap by accumulating skin can reliably be counteracted.

A preferred further development of the invention is distinguished in that, in the region of the contact surface forming the run-on ramp, the roller has a peripheral surface profile oriented parallel to the axis of rotation of the roller. This has a positive effect on the entry process on first contact of the skin with the entry gap. As a result of the mentioned orientation of the peripheral surface profile, the skin is pulled into the entry gap only in the circumferential direction of the roller, and it is thus ensured that the skin is gripped in the entry gap as quickly as possible. Only when there is sufficient skin in the entry gap, so that it is gripped securely between the roller and the entry edge, is the skin spread out extensively in the region of the flank guide elements by means of the peripheral surface profile, in order to prevent blocking by excessive skin accumulation in the entry gap.

According to a further preferred embodiment, the skinning device is arranged mounted to be resiliently deflectable relative to the conveying device. This allows poultry carcasses and poultry parts of different sizes to be processed. By means of resilient deflection of the skinning device, the above-described squeezing and compression of the poultry part is limited to predetermined maximum values. If, for example, poultry parts of small size pass through the guide element, deflection of the skinning device is not required or is required to only a very small degree. The passage of a larger poultry part could lead to the compressing and squeezing effect by the guide element becoming too great. The resiliently deflectable mounting of the skinning device in this case permits a certain degree of deflection against spring force, so that the maximum predetermined forces acting on the poultry part to be skinned are maintained.

A further expedient embodiment of the invention is characterised in that the flank guide elements each comprise cutting means adapted for separating the connection between the skin and the poultry part. The cutting means allow the skin adhering to the poultry carcass in the region of the respiratory fold to be cut through precisely and accurately. By using the cutting means according to the invention, the skin is not torn from the poultry carcass, but the skin connection is cut through in a controlled and precisely reproducible manner. Preferably, therefore, the cutting means are arranged on the exit side, downstream of the guide element relative to the conveying direction.

A preferred further development of the invention is distinguished in that each of the cutting means has a cutting edge which is configured to be inclined relative to the conveying direction. This inclined position of the cutting edge reduces the cutting forces acting on the skin connection and thus results in the skin connection being cut through more gently, which has a positive effect on the reproducibility and accuracy of the separating cut.

According to a further preferred embodiment, the cutting edge is sickle-shaped. In this manner it is ensured that the skin connection is cut through cleanly in every case. Owing to the sickle shape, the skin is "caught" in the concave part of the cutting edge. Any "sliding over" the cutting edge without actually being cut through is thus ruled out, so that the separating cut is performed with high reliability and precision.

A further expedient embodiment of the invention is characterised in that the cutting edges are each bevelled on both sides. The cutting edges bevelled on both sides effect improved selection behaviour of the cutting means in that the cutting edges have an additional directing function. In particular, damage to the flesh as a result of undesired cuts into the flesh is ruled out.

According to a further preferred embodiment of the invention, the cutting means are mounted to be resiliently deflectable transversely to the conveying direction. The present invention is therefore adapted for the processing of poultry of different anatomies and sizes. As a result of the mentioned deflectable mounting, the cutting means are adapted to be self-adjusting and adapt automatically to the particular width of the poultry parts.

The object is further achieved by a corresponding method having the features mentioned hereinbefore, in that the poultry part is guided laterally by means of flank guide elements in each case laterally by contact of inner guide surfaces with the flesh of the poultry part.

A preferred further development of the invention is distinguished by guiding the skin connected on the poultry part side by means of outer guide surfaces of the flank guide elements, which in each case extend between the entry edge and a separating edge, at which in each case the inner guide surface adjoins the outer guide surface.

According to an advantageous further development of the method according to the invention it is provided that at least part-regions of the poultry part are elastically squeezed by conveying the poultry part over a run-on ramp, wherein the run-on ramp is formed by a contact surface arranged between the inner guide surfaces, and wherein the contact surface of the run-on ramp, starting from the entry edge, is inclined by an angle $\alpha$ relative to a roller tangential.

A further expedient embodiment is distinguished by lateral squeezing of the poultry part transversely to the conveying direction by means of the flank guide elements, the clear width of which between the inner guide surfaces tapers in the conveying direction.

According to a further preferred embodiment, the roller is driven by means of a drive unit, so that the circumferential speed of the roller is greater than the conveying speed of the conveying device.

An advantageous variant of the method according to the invention is distinguished in that the removal of the skin takes place at least with a sub-component in the direction of the end faces of the roller by means of a peripheral surface profile of the roller in the region of the flank guide elements which is oriented inclined relative to the axis of rotation of the roller.

Further preferably, the skin is pulled into the entry gap in the region of the run-on ramp in the direction of rotation of the roller by means of a peripheral surface profile oriented parallel to the axis of rotation of the roller.

According to a preferred embodiment, the skinning device is resiliently deflected relative to the conveying device as one of the poultry bodies passes through.

A preferred further development of the invention is distinguished by separation of the remaining connection between the skin and the poultry part by means of cutting means.

A further expedient embodiment of the invention is characterised in that the separation takes place on the exit side, that is to say immediately before the poultry part has passed through the guide element completely.

According to a further preferred embodiment, the separation takes place by means of cutting means having a cutting edge which is inclined relative to the conveying direction.

According to a further preferred embodiment of the invention, the cutting means deflect resiliently transversely to the conveying direction.

The advantages associated with the method according to the invention correspond in an analogous manner to the advantages achieved with the arrangement according to the invention and already described hereinbefore. Therefore, in order to avoid repetition, reference is made in connection with the method according to the invention to the advantages already mentioned with the arrangement according to the invention.

BRIEF DESCRIPTION OF THE DRAWINGS

Further preferred and/or expedient features and embodiments of the invention will become apparent from the description. Particularly preferred embodiments will be described in greater detail with reference to the accompanying drawing, in which.

DETAILED DESCRIPTION OF THE INVENTION

Figure 1:
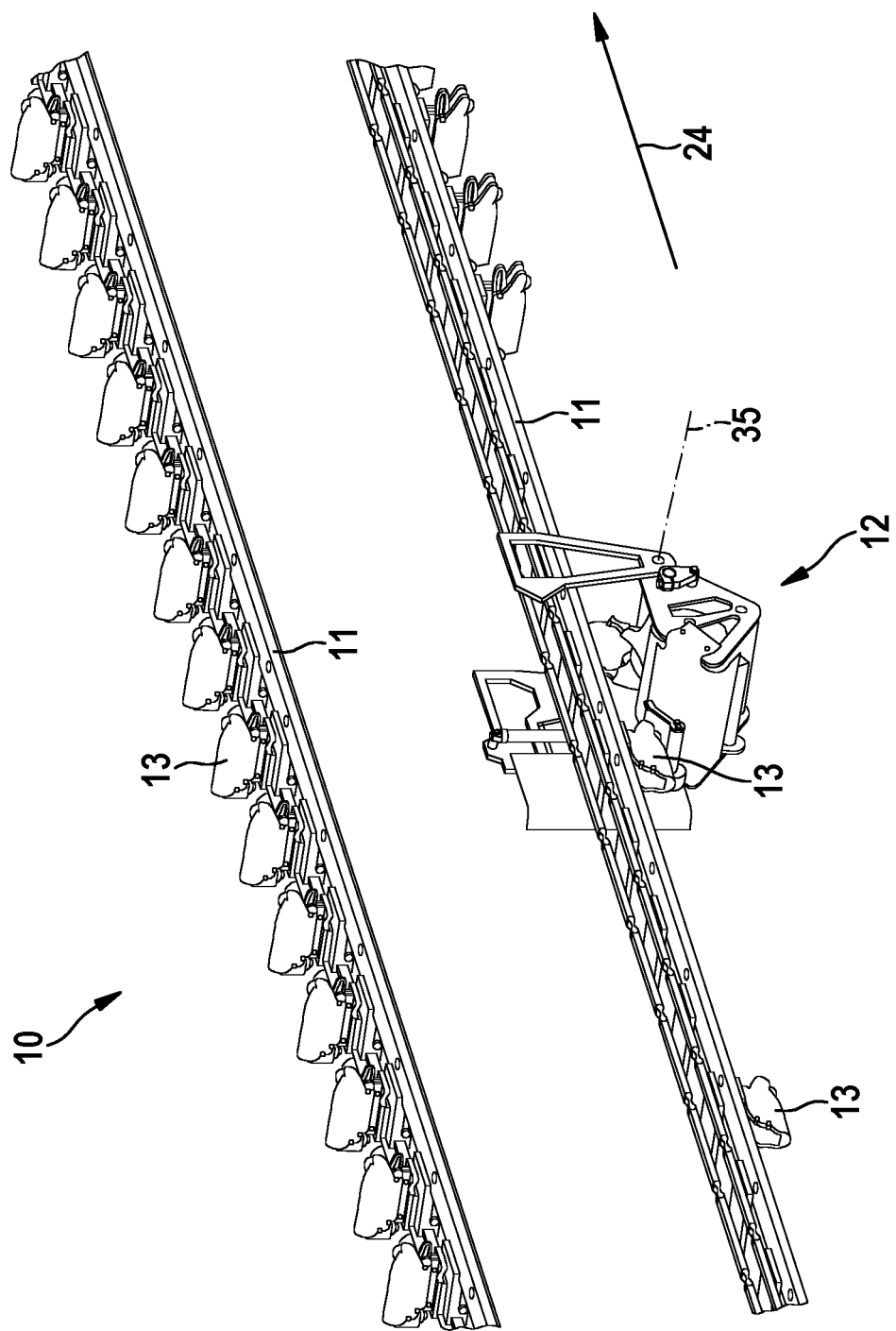
FIG. 1 is a schematic representation of the arrangement according to the invention in a perspective view.

FIG. 1 shows a schematic representation of the arrangement 10 according to the invention in a perspective view. The arrangement 10 is configured and adapted for skinning poultry parts—not shown in the drawing—containing the poultry breast. The poultry parts are preferably poultry breast caps or front halves of poultry carcasses. The poultry skin to be removed generally lies over the breast fillet but is not fixedly adhered thereto. In the region of the respiratory fold, at each of the flanks of the poultry carcass, the skin is adhered to the poultry carcass.

The arrangement 10 according to the invention comprises a conveying device 11 which is configured and adapted for conveying the poultry parts in a conveying direction 24. Along the conveying line formed by the conveying device 11 there is arranged a skinning device 12. The conveying device 11 comprises saddle elements 13 which are configured and adapted for receiving the poultry parts.

Figure 2:
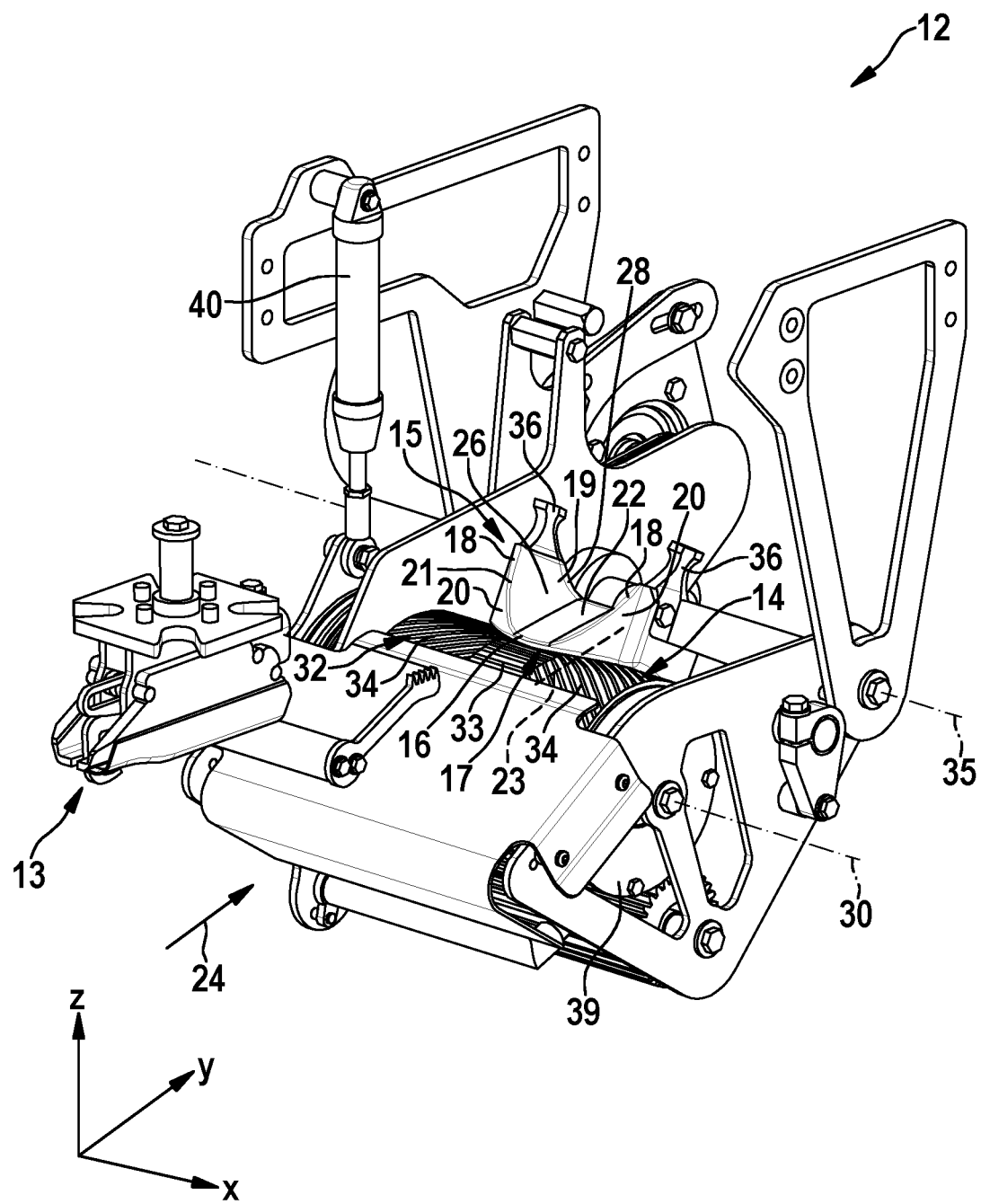
FIG. 2 is a perspective view of the skinning device according to the invention.
Figure 3:
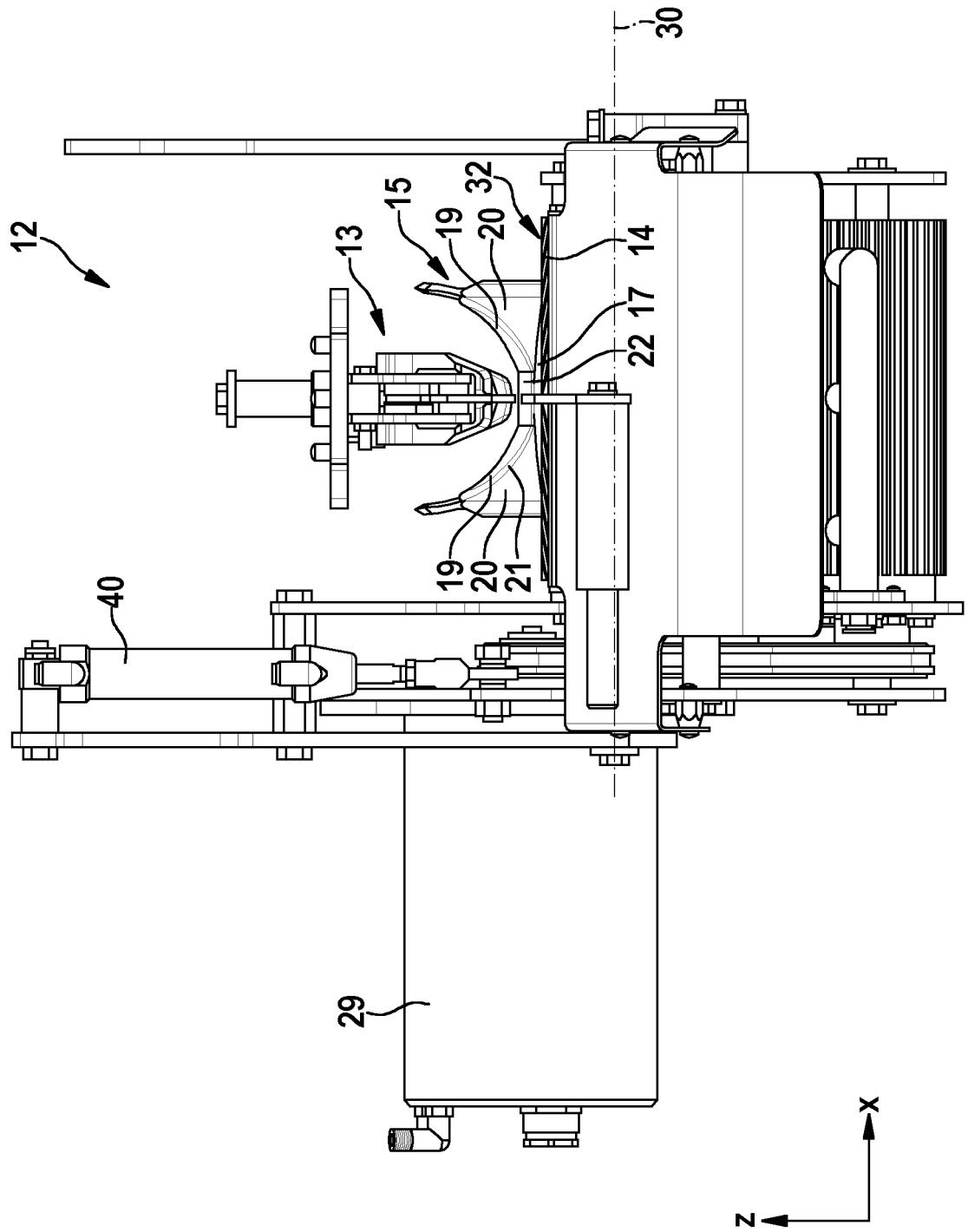
FIG. 3 is a front view of the skinning device shown in FIG. 2, looking in the conveying direction.
Figure 4:
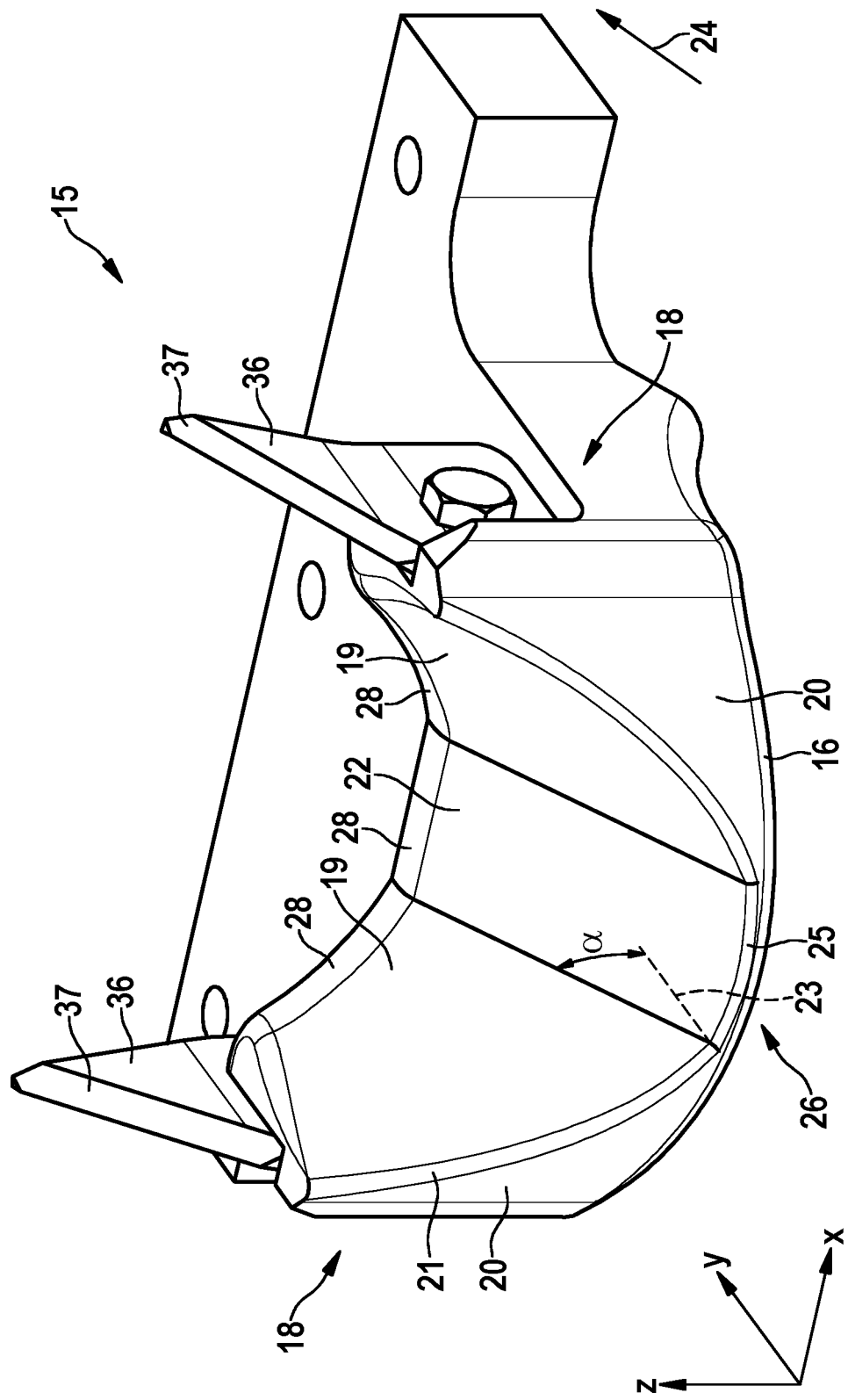
FIG. 4 is a perspective view of the guide element according to the invention according to a first embodiment.

FIGS. 2 and 3 show the skinning device 12 according to the invention in detail in different views. For reasons of clarity, the two figures do not show the entire conveying device 11 but in each case only one of the saddle elements 13.

The skinning device 12 comprises a rotationally driven profiled roller 14 and a guide element 15. The roller 14, together with an entry edge 16 of the guide element 15, forms an entry gap 17 for gripping the skin on the poultry breast side. By pulling the poultry skin into the entry gap 17, the skin is removed from the poultry part.

The guide element 15 comprises flank guide elements 18 which are each adapted for laterally guiding the poultry part. The flank guide elements 18 are adapted to contact the flesh of the poultry part, that is to say, while the poultry skin is being removed via the profiled roller 14, the flank guide elements 18 come into direct contact with the underlying flesh of the breast fillets. For this purpose, the flank guide elements 18 each have inner guide surfaces 19. The flank guide elements 18 therefore have a guiding and directing function, in order to guide the poultry body in a defined manner and guide it past the roller 14 without parts of the poultry body—with the exception of the skin—coming into contact with the roller 14.

The flank guide elements 18 preferably each comprise outer guide surfaces 20 adapted for guiding the skin connected on the poultry part side, wherein the outer guide surfaces 20 each extend between the entry edge 16 and a separating edge 21, at which in each case the inner guide surface 19 adjoins the outer guide surface 20. The poultry skin is pulled over the separating edge 21 by the interaction of the rotationally driven profiled roller 14 and in each case laterally via the flank guide elements 18. Graphically described, the poultry skin "flows round" the guide element 15 laterally and is removed from the poultry part via the entry gap 17.

Advantageously, the inner guide surfaces 19 with their separating edge 21 are each curved concavely or substantially concavely. It is particularly advantageous that the concavity of the inner guide surfaces 19 is configured corresponding substantially to the anatomy of the poultry part to be skinned, that is to say, for example, is adapted to the outer form of the outer fillet that is still on the poultry carcass. Depending on the types of poultry to be processed, the inner guide surfaces 19 can be of correspondingly different forms. The inner guide surfaces 19 are in any case preferably so adapted that they come into contact as far as possible with the entire surface of the outer fillets of the poultry part.

Further preferably, the guide element 15 has a contact surface 22 which is arranged between the inner guide surfaces 19 and forms an inclined run-on ramp extending from the entry edge 16. The contact surface 22 is inclined by an angle $\alpha$ relative to a roller tangential 23. The roller tangential 23 denotes the tangential of the roller circumference that lies in the XY plane. In other words, the contact surface 22 is arranged inclined by the angle $\alpha$ relative to the XY plane.

Such an inclined contact surface 22 is shown in particular in each of FIGS. 4 to 8. The poultry parts conveyed in the conveying direction 24 meet this contact surface 22. Because the contact surface 22 is inclined, the poultry parts are on the one hand compressed to a certain extent and at the same time lifted slightly relative to the Z-axis, that is to say directed away from the roller 14, so that the above-described "flowing round" of the poultry skin around the flank guide elements 18 is additionally assisted. Because of the comparatively larger clear width between the contact surface 22 and the saddle elements 13 in the entry region 26, the entry of the poultry part into the guide element 15 takes place with as little resistance as possible, so that reliable entry of the poultry carcass between the inner guide surfaces 19 is ensured. The inclined arrangement of the contact surface 22 leads to a continuous reduction of the clear width in the direction of the exit region 27 of the guide element 15, so that the mechanical resistance contrary to the conveying direction likewise increases continuously and the above-described lifting and compression effect occurs.

Preferably, the separating edge 21 in each case laterally adjoins the contact surface edge 25 seamlessly. In this manner, the contact surfaces 22 form with the separating edge 21 a closed enveloping surface which is free of steps and protrusions, so that the poultry carcass is able to slide thereover. For the same reasons, the contact surface edge 25 of the contact surface 22 in the form of a run-on ramp is further preferably adapted to adjoin the entry edge 16 directly.

Advantageously, the flank guide elements 18 as a whole are so configured that the clear width between the inner guide surfaces 19 tapers in the conveying direction 24. The inner guide surfaces 19 are consequently not only curved in the XZ plane but additionally form surfaces that face one another in the XZ plane. For this purpose, the inner guide surfaces 19 can be arranged, for example, sloping in the XZ plane or, as shown in the drawing, can be curved. The inner guide surfaces 19 are thus curved relative to one or more spatial directions.

The inner guide surfaces 19 of the flank guide elements 18 each have end edges 28. Preferably, the end edge 28 of one of the inner guide surfaces 19 is shorter than the respective portion of the separating edge 21 of the same inner guide surface 19. The described geometry of the end edges 28 and of the respective portions of the separating edge 21 thus define the edge geometry of the inner guide surfaces 19. The inner guide surfaces 19 are themselves configured as enveloping surfaces which span the region between that defined edge geometry. In other words, the inner guide surfaces 19 are so adapted that they span the region between the end edge 28 and the separating edge 21 of the respective inner guide surface 19.

Preferably, the separating edge 21, the contact surface edges 25 and/or the end edges 28 are in rounded form. This effects better gliding of the skin and poultry part over the guide element 15 and at the same time prevents damage and injury to the flesh as a result of mechanical action, which can ultimately lead to an end product of lesser quality.

Advantageously, the roller 14 is driven by means of a drive unit 29—shown only in FIG. 3 for reasons of clarity—in such a manner that the circumferential speed of the roller 14 is greater than the conveying speed of the conveying device 11. The skin which has entered the entry gap 17 is thus removed with a higher speed—compared to the conveying speed of the poultry part. In this manner, a correspondingly high pulling force is exerted on the poultry skin, which deforms elastically to a certain extent under the action of the force. The difference in speed is specifically chosen so that the developing pulling force is sufficiently great to detach the skin from the poultry carcass in regions in which it is not adhered to the poultry carcass and to allow it to glide over the guide element 15, but the skin is not uncontrollably torn from the poultry part or the skin is not ripped.

It is apparent from FIG. 2 that the roller 14 has, preferably in the region of the flank guide elements 18, a peripheral surface profile which is inclined relative to its axis of rotation 30. The roller 14 is thus provided with a toothing in those regions. This has the effect that the skin is not only pulled in the circumferential direction of the roller 14, but the skin is also distributed on the circumferential surface 32 of the roller 14 in a further directional component, namely parallel to the axis of rotation.

Particularly preferably, the inclination of the peripheral surface profile in the region of the flank guide elements 18—and optionally laterally therebeyond—is inclined to the end faces of the rollers contrary to the direction of rotation of the roller 14. This has the effect that the skin which enters the entry gap 17 is additionally pulled laterally outwards and thus spreads extensively over the circumferential surface 32 of the roller 14.

Advantageously, the roller 14 has, in the region of the contact surface 22 forming the run-on ramp, a peripheral surface profile which is oriented parallel to the axis of rotation 30 of the roller 14. This offers the advantage that, the first time the skin comes into contact with the roller 14 and the entry edge 16, the skin is pulled as quickly as possible into the entry gap 17 parallel to the conveying direction 24 and in this manner is gripped with a high degree of reliability. Once the first skin region has been pulled into the entry gap 17 and has extended over the entire width of the peripheral profile oriented parallel to the axis of rotation 30, even spreading of the skin over the circumferential surface 32 of the roller is effected via the above-mentioned peripheral profiles in the region of the flank guide elements 18.

The circumferential surface 32 of the roller 14 is consequently divided into three regions. An inner region 33, which is associated substantially with the contact surface 22, has the mentioned peripheral profile with a profile oriented parallel to the axis of rotation 30, while the described peripheral profile inclined relative to the axis of rotation 30 is provided in each case in outer regions 34.

The skinning device 12 is preferably arranged mounted to be resiliently deflectable relative to the conveying device 11. For example, the skinning device 12, as is shown by way of example in FIGS. 2 and 3, is arranged to be pivotable about a pivot axis 35 and is resiliently mounted via a pneumatic element 40. When a poultry part passes through the skinning device 12, the entire skinning device 12 is deflected downwards by a pivoting movement against the spring bias by the pneumatic element 40 as soon as the poultry part passes through the guide element 15 with corresponding compression. In this manner, the compression effected on the poultry part by the guide element 15 is compensated for to a certain extent, so that the processing of poultry bodies of differing anatomy and size is possible. Instead of the pneumatic element 40, other elements having a spring action, for example tension springs, can be used as an alternative. The pneumatic element 40 offers the advantage that the spring force is adjustable by the application of compressed air and is optimally adaptable to the particular production requirements. Furthermore, the pneumatic element 40 is actively activated subsidiarily or solely in order to effect the deflection of the skinning device and as rapid a return thereof as possible to the starting position.

As is shown in FIGS. 4 to 8, flank guide elements 18 each comprise cutting means 36 adapted to separate the connection between the skin and the poultry part. By means of the cutting means 36, the connection of the skin to the poultry carcass in the region of the respiratory fold is cut through and thus the skin is detached completely from the carcass. In this manner, a controlled cut is performed. In conjunction with the precise guiding of the poultry carcass effected by the guide element 15 and the sections of skin already detached from the poultry part, the last skin connection is cut through precisely at exactly the correct point. An optimal separating cut for every poultry geometry is thus performed by a surprisingly simple structural design of the arrangement 10 according to the invention.

Preferably, the cutting means 36 are arranged on the exit side, downstream of the guide element 15 relative to the conveying direction 24. Cutting through of the skin connection by means of the cutting means 36 therefore only takes place shortly before the poultry part has passed through the guide element 15 completely.

Figure 5:
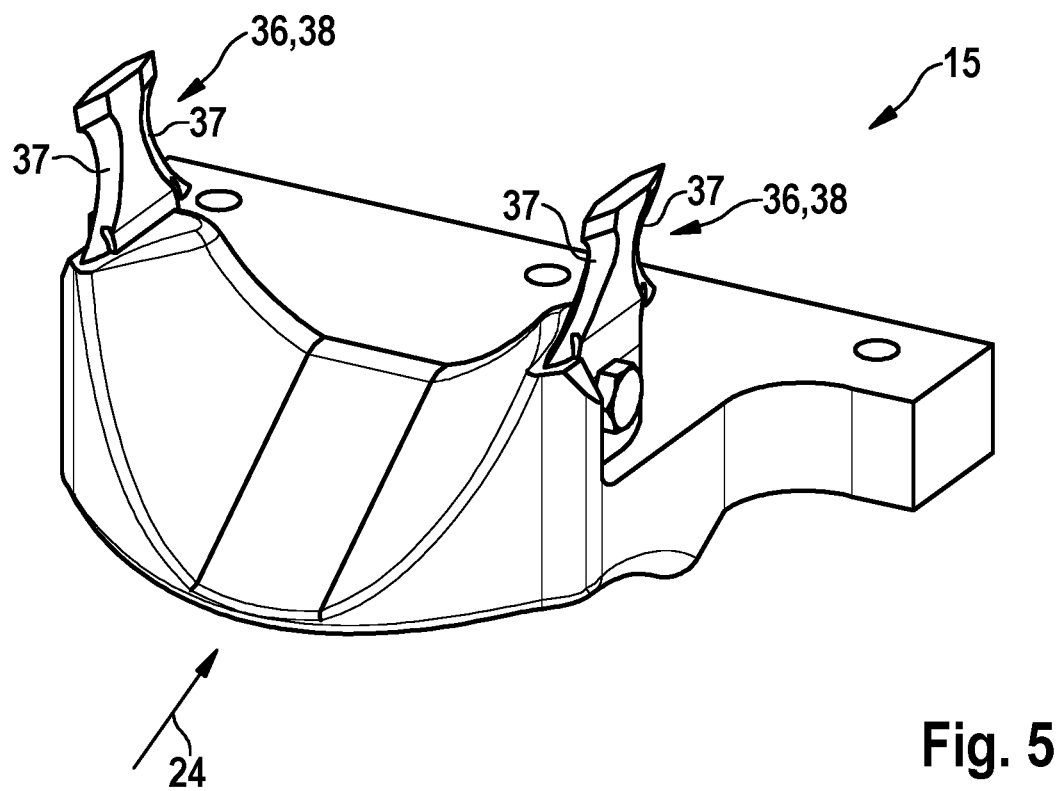
FIG. 5 is a perspective view of the guide element according to the invention according to a second embodiment.
Figure 6:
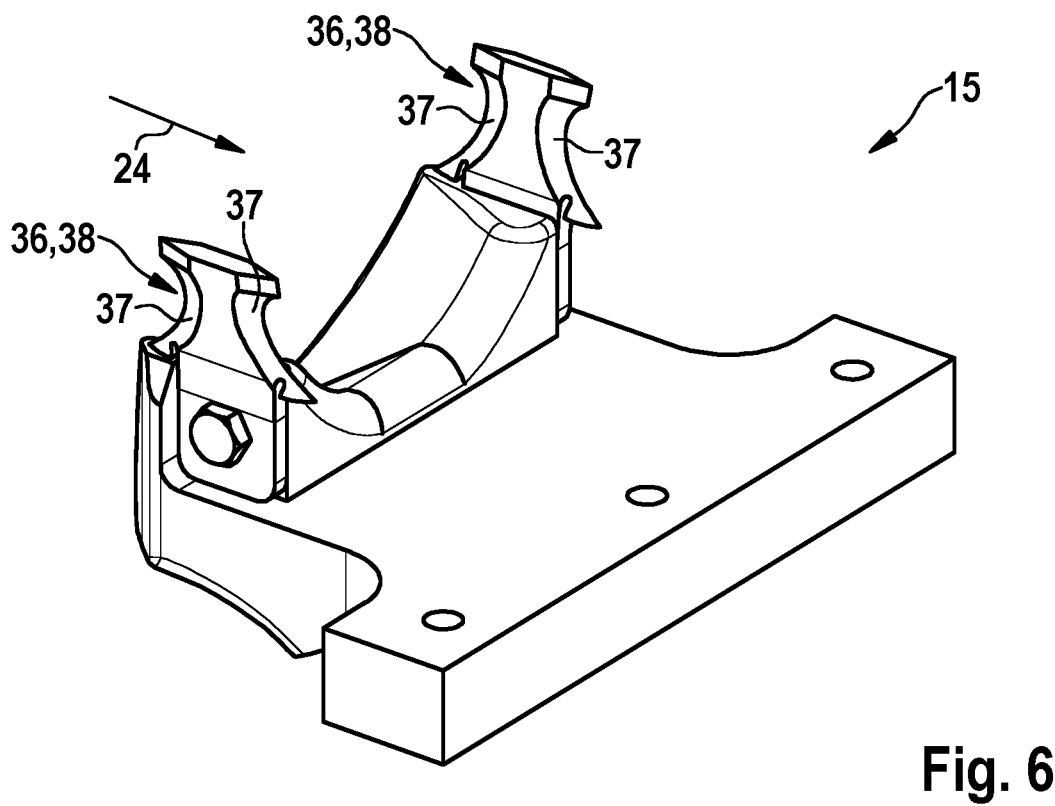
FIG. 6 is a perspective view of the guide element shown in FIG. 5 from a further viewing direction.
Figure 7:
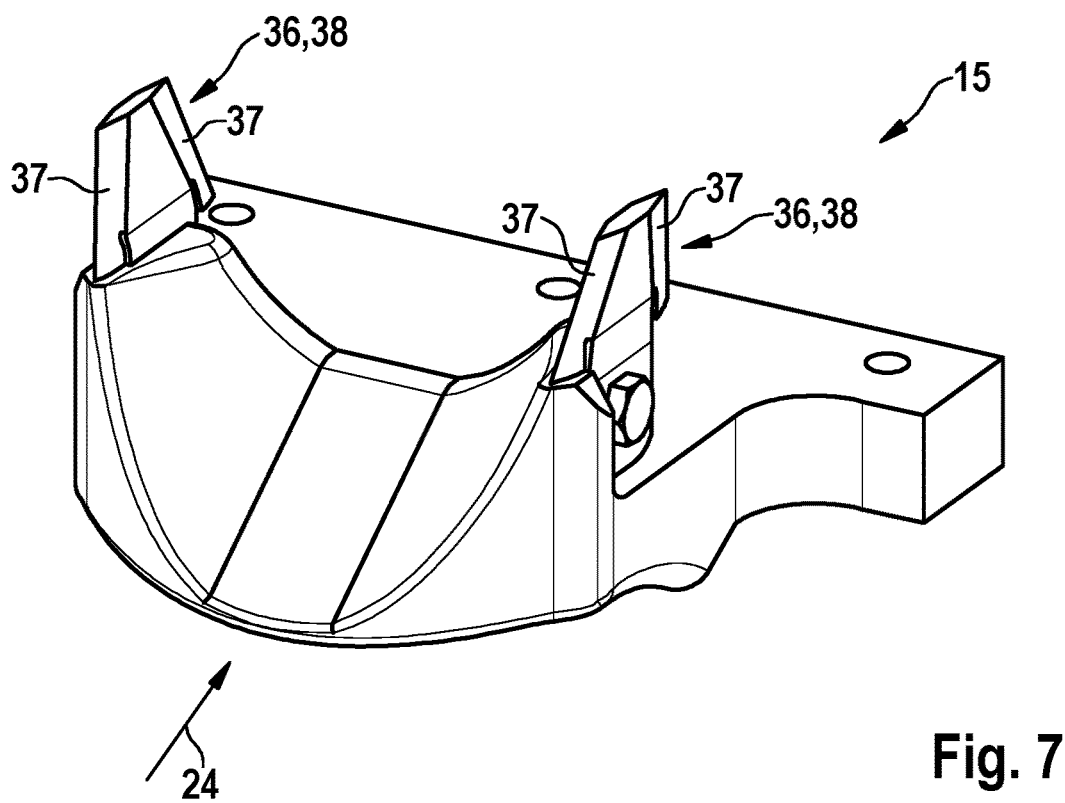
FIG. 7 is a perspective view of the guide element according to the invention according to a third embodiment.

The cutting edges 37 of each of the cutting means 36 are preferably inclined relative to the conveying direction 24. According to the exemplary embodiment shown in FIG. 4, the knives are in the form of triangular knives. Alternatively, the cutting means 36, as is shown in FIGS. 5 and 6, are configured with a sickle-shaped cutting edge 37. This offers the advantage that the skin which is adhered to the carcass is "caught" in the concave cutting edge form. It is thus ensured that the skin connection is cut through by means of the cutting means 36 in every case. The skin thus cannot slide over the cutting edge 37 without being cut through completely.

As is apparent in FIGS. 5 to 8, the cutting means 36 are preferably each in the form of double knives 38, that is to say they have cutting edges 37 on each of their front and rear sides. This offers the advantage that a blunt cutting edge 37 can be exchanged in a simple manner by rotating the cutting means 36 through 180°, without having to replace the whole cutting means 36.

Figure 8:
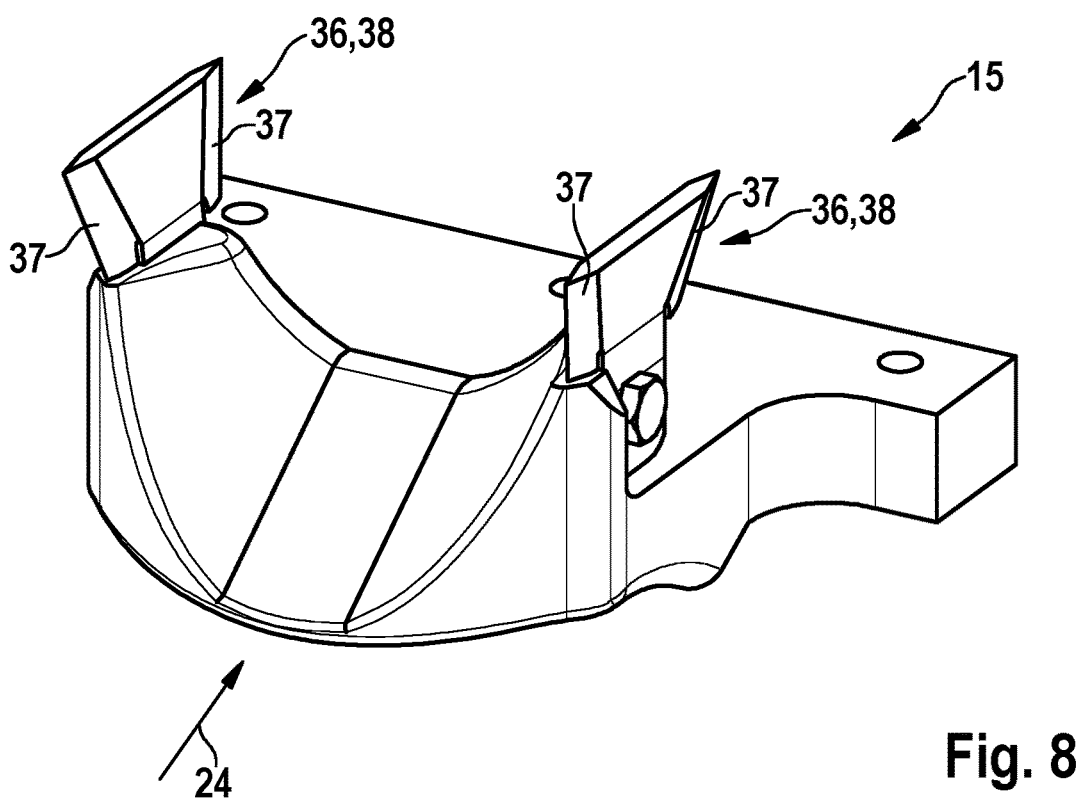
FIG. 8 is a perspective view of the guide element according to the invention according to a fourth embodiment.

As is shown in FIG. 8, it is provided according to a further advantageous embodiment of the invention that the cutting edge 37 is so inclined that the cutting edges 37, starting from the flank guide element 18, extend contrary to the conveying direction 24. In this manner, a function comparable to the embodiment variant with a sickle-shaped cutting edge 37 is achieved, namely to prevent the skin from gliding over the cutting means 37 without the section of skin being cut through completely. Further preferably, the cutting edges are each bevelled on both sides.

Optimal first cutting of the section of skin that is to be cut through is thus ensured, and at the same time undesirable cutting into the poultry fillets is avoided. Alternatively, the cutting means 36 are mounted to be resiliently deflectable transversely to the conveying direction 24 (not shown in the drawing). The cutting means 36 thus deflect laterally, if required by the width of the poultry carcass. The cutting means 36 are thus adapted to self-adapt to the poultry part.

The method according to the invention is likewise described in connection with the arrangement described hereinbefore. In addition, some selected aspects of the method according to the invention are additionally described hereinbelow.

The method according to the invention for skinning poultry parts containing the poultry breast comprises the steps: conveying the poultry parts in the conveying direction 24 along the skinning device 12 by means of the saddle elements 13 of the conveying device 11, driving at least one profiled roller 14 in rotation, wherein the roller 14, together with an entry edge 16 of a guide element 15, forms an entry gap 17 for gripping the skin on the poultry breast side. The skin is automatically gripped by means of the entry gap 17 while the poultry part is guided laterally by means of flank guiding elements 18. Guiding takes place by contact of inner guide surfaces 19 with the flesh of the poultry part.

The skin connected on the poultry part side is preferably guided by means of the outer guide surfaces 20 of the flank guide elements 18, which in each case extend between the entry edge 16 and a separating edge 21, at which in each case the inner guide surface 19 adjoins the outer guide surface 20.

Advantageously, at least part-regions of the poultry part are squeezed elastically by conveying the poultry part over a run-on ramp, wherein the run-on ramp is formed by a contact surface 22 arranged between the inner guide surfaces 19. The contact surface 22 of the run-on ramp is arranged, starting from the entry edge 16, inclined by an angle α relative to a roller tangential 23.

Preferably, the poultry part is additionally transversely squeezed laterally transversely to the conveying direction 24 by means of the flank guide elements 18, the clear width of which between the inner guide surfaces 19 tapers in the conveying direction 24.

Further preferably, the roller 14 is driven by means of a drive unit 29, so that the circumferential speed of the roller 14 is greater than the conveying speed of the conveying device 11.

Advantageously, the removal of the skin takes place at least with a sub-component in the direction of the end faces 29 of the roller 14 by means of a peripheral surface profile of the roller 14 in the region of the flank guide elements 18, which is inclined relative to the axis of rotation 30 of the roller 14. In particular, the skin is pulled into the entry gap 17 in the region of the run-on ramp in the direction of rotation of the roller 14 by means of a peripheral surface profile oriented parallel to the axis of rotation 30 of the roller 14.

Preferably, the skinning device 12 is resiliently deflected relative to the conveying device 11 as one of the poultry parts or a poultry carcass passes through.

The invention claimed is:

1. An arrangement for skinning poultry parts containing a poultry breast, comprising:
   a skinning device having at least one rotationally driven profiled roller and a guide element with an entry edge, the roller, together with an entry edge of the guide element, being adapted to form an entry gap for gripping skin on a side of the poultry breast, the guide element having flank guide elements each adapted for laterally guiding the poultry part, the flank guide elements having inner guide surfaces adapted for contacting flesh of the poultry part; and
   a conveying device having saddle elements configured for conveying the poultry parts in a conveying direction along the skinning device.

2. The arrangement according to claim 1, wherein the flank guide elements each comprise outer guide surfaces which are adapted for guiding the skin on the side of the poultry breast, each of the outer guide surfaces extending between the entry edge and a separating edge, each inner guide surface adjoining the respective outer guide surface at the separating edge.

3. The arrangement according to claim 2, wherein the inner guide surfaces with their respective separating edge are each curved concavely.

4. The arrangement according to claim 1, wherein the guide element comprises a contact surface arranged between the inner guide surfaces, the contact surface, starting from the entry edge, forms a run-on ramp which is inclined by an angle α relative to a tangential of the roller.

5. The arrangement according to claim 4, wherein the separating edge in each case seamlessly laterally adjoins an edge the contact surface.

6. The arrangement according to claim 5, wherein the contact surface edge is adapted to directly adjoin the entry edge.

7. The arrangement according to claim 1, wherein the flank guide elements are configured such that a clear width between the inner guide surfaces tapers in the conveying direction.

8. The arrangement according to claim 1, wherein the inner guide surfaces of the flank guide elements each have an end edge, each end edge being shorter than a respective portion of the separating edge of the same inner guide surface.

9. The arrangement according to claim 8, wherein each of the inner guide surfaces is configured as an enveloping surface which spans a region between the end edge and the separating edge of the respective inner guide surface.

10. The arrangement according to claim 8, wherein the separating edge, the contact surface edges and/or the end edges are in rounded form.

11. The arrangement according to claim 1, wherein the roller is driven by a drive unit in such a manner that a circumferential speed of the roller is greater than a conveying speed of the conveying device.

12. The arrangement according to claim 1, wherein, in a region of the flank guide elements, the roller has a peripheral surface profile which is inclined relative to its axis of rotation.

13. The arrangement according to claim 12, wherein the peripheral surface profile in the region of the flank guide elements is inclined to end faces of the roller contrary to a direction of rotation of the roller.

14. The arrangement according to claim 4, wherein, in a region of the contact surface forming the run-on ramp, the roller has a peripheral surface profile oriented parallel to its axis of rotation.

15. The arrangement according to claim 1, wherein the skinning device is mounted such that the skinning device is resiliently deflectable relative to the conveying device.

16. The arrangement according to claim 1, wherein the flank guide elements each comprise cutting means adapted for separating a connection between the skin and the poultry breast.

17. The arrangement according to claim 16, wherein each cutting means is arranged on an exit side, downstream of the guide element relative to the conveying direction.

18. The arrangement according to claim 16, wherein each of the cutting means has a cutting edge, the cutting edges being configured to be inclined relative to the conveying direction.

19. The arrangement according to claim 18, wherein each cutting edge is sickle-shaped.

20. The arrangement according to claim 18, wherein the cutting edges are each bevelled on both sides.

21. The arrangement according to claim 16, wherein the cutting means are mounted such that the cutting means are resiliently deflectable transversely to the conveying direction.

22. A method for skinning poultry parts containing a poultry breast, comprising the steps of:
   conveying the poultry parts in a conveying direction along a skinning device by saddle elements of a conveying device;
   driving at least one profiled roller in rotation, wherein the roller, together with an entry edge of a guide element, forms an entry gap for gripping skin on a side the poultry breast;
   automatically gripping the skin by the entry gap;
   wherein lateral guiding of the poultry part is by flank guide elements, by contact of an inner guide surface of each flank guide elements with the flesh of the poultry part.

23. The method according to claim 22, further comprising:
   guiding the skin on the side of the poultry part by outer guide surfaces of the flank guide elements, each outer guide surface extending between the entry edge and a separating edge, each inner guide surface adjoining the respective outer guide surface at the separating edge.

24. The method according to claim 22, further comprising:
   elastic squeezing at least of part-regions of the poultry part by conveying the poultry part over a run-on ramp which is formed by a contact surface arranged between the inner guide surfaces, the contact surface of the run-on ramp, starting from the entry edge, is inclined by an angle $\alpha$ relative to a tangential of the roller.

25. The method according to claim 22, further comprising:
   lateral squeezing of the poultry part transversely to the conveying direction by the flank guide elements, a clear width of which between the inner guide surfaces tapers in the conveying direction.

26. The method according to claim 22, wherein:
   the driving of the roller is by a drive unit such that that a circumferential speed of the roller is greater than a conveying speed of the conveying device.

27. The method according to claim 22, further comprising:
   removal of the skin at least with a sub-component in a direction of end faces of the roller by a peripheral surface profile of the roller in a region of the flank guide elements which is oriented inclined relative to an axis of rotation of the roller.

28. The method according to claim 24, further comprising:
   pulling of the skin into the entry gap in the region of the run-on ramp in a direction of rotation of the roller by a peripheral surface profile oriented parallel to an axis of rotation of the roller.

29. The method according to claim 22, further comprising:
   resiliently deflecting the skinning device relative to the conveying device as one of the poultry bodies passes through.

30. The method according to claim 22, further comprising:
   separation of a remaining connection between the skin and the poultry part by cutting means.

31. The method according to claim 30, wherein the separation takes place on an exit side, immediately before the poultry part has passed completely through the guide element.

32. The method according to claim 30, wherein the separation takes place by the cutting means having a cutting edge which is inclined relative to the conveying direction.

33. The method according to claim 30, further comprising resiliently deflecting of the cutting means transversely to the conveying direction.

* * * * *